(12) United States Patent
Wang et al.

(10) Patent No.: US 9,274,784 B2
(45) Date of Patent: Mar. 1, 2016

(54) AUTOMATIC DEPLOYMENT AND UPDATE OF HYBRID APPLICATIONS

(71) Applicants: Qiushi Wang, Singapore (SG); Lin Cao, Singapore (SG)

(72) Inventors: Qiushi Wang, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/294,133

(22) Filed: Jun. 2, 2014

(65) Prior Publication Data

US 2015/0347119 A1    Dec. 3, 2015

(51) Int. Cl.
*G06F 9/44* (2006.01)
*G06F 9/445* (2006.01)
*H04L 29/08* (2006.01)
*G06F 17/30* (2006.01)

(52) U.S. Cl.
CPC .. *G06F 8/65* (2013.01); *G06F 8/70* (2013.01); *G06F 17/30153* (2013.01); *H04L 67/10* (2013.01)

(58) Field of Classification Search
USPC .......................................................... 717/120
See application file for complete search history.

(56) References Cited

U.S. PATENT DOCUMENTS

| | | | | |
|---|---|---|---|---|
| 7,127,712 B1 * | 10/2006 | Noble | ...................... | G06F 8/65 717/168 |
| 7,243,346 B1 * | 7/2007 | Seth et al. | ...................... | 717/163 |
| 7,950,010 B2 * | 5/2011 | Goger | ...................... | G06F 8/61 709/220 |
| 8,136,100 B1 * | 3/2012 | Goldman | ...................... | G06F 8/61 717/120 |
| 8,417,798 B2 * | 4/2013 | Chen | ...................... | G06F 8/38 709/203 |
| 9,158,522 B2 * | 10/2015 | Nyisztor | ...................... | G06F 8/60 |
| 2004/0261060 A1 * | 12/2004 | Haselden | ...................... | G06F 8/61 717/120 |
| 2005/0144619 A1 * | 6/2005 | Newman | ...................... | G06F 8/61 717/177 |
| 2006/0184926 A1 * | 8/2006 | Or | ...................... | G06F 8/61 717/168 |
| 2007/0006217 A1 * | 1/2007 | Tammana | ...................... | G06F 8/61 717/174 |
| 2007/0101197 A1 * | 5/2007 | Moore | ...................... | G06F 8/61 717/38.1 |
| 2008/0127169 A1 * | 5/2008 | Malasky | ...................... | G06F 8/61 717/174 |
| 2008/0127170 A1 * | 5/2008 | Goldman | ...................... | G06F 8/61 717/174 |

(Continued)

OTHER PUBLICATIONS

Dominique Vernier et al., Develop, Deploy and Update a Mobile Application in the Cloud in 60 Mins or Less, IBM, 2013.

(Continued)

*Primary Examiner* — Marina Lee
(74) *Attorney, Agent, or Firm* — Horizon IP Pte. Ltd.

(57) ABSTRACT

Described herein is a framework for deploying and updating applications (Apps). In accordance with one aspect, a source code of a hybrid application may be provided by a development environment running on a cloud server, in response to a user event. A deployment generator running on the cloud server may be automatically invoked to receive the source code of the hybrid application. The source code of the hybrid application may be further packaged to form a hybrid application package for deployment by the deployment generator. The hybrid application package may be deployed to a deployment service on the cloud server.

17 Claims, 7 Drawing Sheets

(56) References Cited

U.S. PATENT DOCUMENTS

| | | | | |
|---|---|---|---|---|
| 2008/0127171 A1* | 5/2008 | Tarassov | ............ | G06F 8/60 |
| | | | | 717/174 |
| 2008/0201705 A1* | 8/2008 | Wookey | ............ | G06F 8/68 |
| | | | | 717/175 |
| 2011/0185339 A1* | 7/2011 | Andrade | ............ | G06F 8/20 |
| | | | | 717/104 |
| 2011/0219357 A1* | 9/2011 | Livshits | ............ | H03M 7/30 |
| | | | | 717/115 |
| 2011/0296377 A1* | 12/2011 | Morozov | ............ | G06F 8/30 |
| | | | | 717/113 |
| 2012/0096433 A1* | 4/2012 | Reinhold | ............ | G06F 8/71 |
| | | | | 717/120 |
| 2013/0067459 A1* | 3/2013 | Sannidhanam et al. | ...... | 717/176 |
| 2013/0311984 A1* | 11/2013 | Kaiwar | ............ | G06F 8/65 |
| | | | | 717/172 |
| 2015/0082298 A1* | 3/2015 | Wang et al. | ............ | 717/174 |
| 2015/0113504 A1* | 4/2015 | Artzi | ............ | G06F 8/60 |
| | | | | 717/120 |

OTHER PUBLICATIONS

IBM, Deploying to the cloud by using IBM PureApplication System, IBM Worklight, Copyright 2006, 2014, IBM Corporation.
Salesforce, How Salesforce1 Can Help Developers in India Become Mobile Developers, https://developer.salesforce.com/blogs/developer-relations/2013/12/how-salesforce1-can-help-developers-in-india-become-mobile-developers.html, Dec. 20, 2013.
Antenna, AMPchroma, Copyright 2012, Antenna Software Inc.

* cited by examiner

AUTOMATIC DEPLOYMENT AND UPDATE OF HYBRID APPLICATIONS

TECHNICAL FIELD

The present disclosure relates generally to a framework for deploying and updating applications (Apps).

BACKGROUND

Apps are developed for a wide variety of purposes. There are different types of Apps. For example, native Apps are downloaded, installed and run on devices. A native App is written for a specific kind of device or platform. Native Apps take advantage of the various functions available on a device. On the other hand, Web Apps reside on a server. A device accesses a Web App through its browser. By being browser-based, any device with a browser can access Web Apps. In other words, Web Apps are not platform or device type-specific. However, Web Apps cannot cross the boundaries of web browsers, thus restricting access to some system-specific resources.

A hybrid App is another type of App. Hybrid Apps combine elements of both native and Web Apps. Hybrid apps provide benefits of both native and Web Apps. For example, hybrid Apps can be accessed through a browser while having access to various functions and features of a device. However, deployment of hybrid Apps requires significant efforts and time. For example, properly setting up the native development environment and preparing the required web contents is very complex and prone to errors. Updating of a hybrid App also requires significant effort. For example, when a hybrid App is updated, the corresponding native development environment is also required to be upgraded and updated accordingly.

From the foregoing discussion, it is desirable to provide an approach to automatically deploy and update hybrid Apps without complicated environment setting.

SUMMARY

A framework for deploying and updating applications (Apps) is described herein. In accordance with one aspect, a source code of a hybrid application may be provided by a development environment running on a cloud server, in response to a user event. A deployment generator running on the cloud server may be automatically invoked to receive the source code of the hybrid application. The source code of the hybrid application may be further packaged to form a hybrid application package for deployment by the deployment generator. The hybrid application package may be deployed to a deployment service on the cloud server.

In accordance with another aspect, a source code of a hybrid application may be provided by a development environment running on a cloud server, in response to a user event. A deployment generator running on the cloud server may be automatically invoked to receive the source code of the hybrid application. The deployment generator may scan the source code of the hybrid application to identify and remove design time files, resulting in a scanned application file. The scanned application file may be analyzed to resolve runtime dependencies of the hybrid application as well as retrieving dependent libraries, resulting in a resolved application file. The resolved application file may be further converted to files and folders compatible for deployment to the deployment service on the cloud, resulting in a converted application file, which may be compressed to form a compressed application file.

The deployment generator may further generate a deployment metadata file, and package the compressed application file and deployment metadata file to produce an application package. The application package may then be deployed to a deployment service on the cloud server.

In accordance with yet another aspect, an application development system is described. The application development system includes an application developer running on a cloud server. The application developer further includes a development environment and a deployment generator. The development environment enables a developer to create a new hybrid application or update an existing hybrid application to produce an update hybrid application, while the deployment generator packages the new hybrid application or packages the update hybrid application, and deploys the new hybrid application or the update hybrid application to a deployment service on the cloud.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures. Like reference numerals in the figures designate like parts.

DETAILED DESCRIPTION

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of present frameworks and methods, and to thereby better explain the present frameworks and methods. Furthermore, for ease of understanding, certain method steps are delineated as separate steps; however, these separately delineated steps should not be construed as necessarily order dependent or being separate in their performance.

Figure 1:
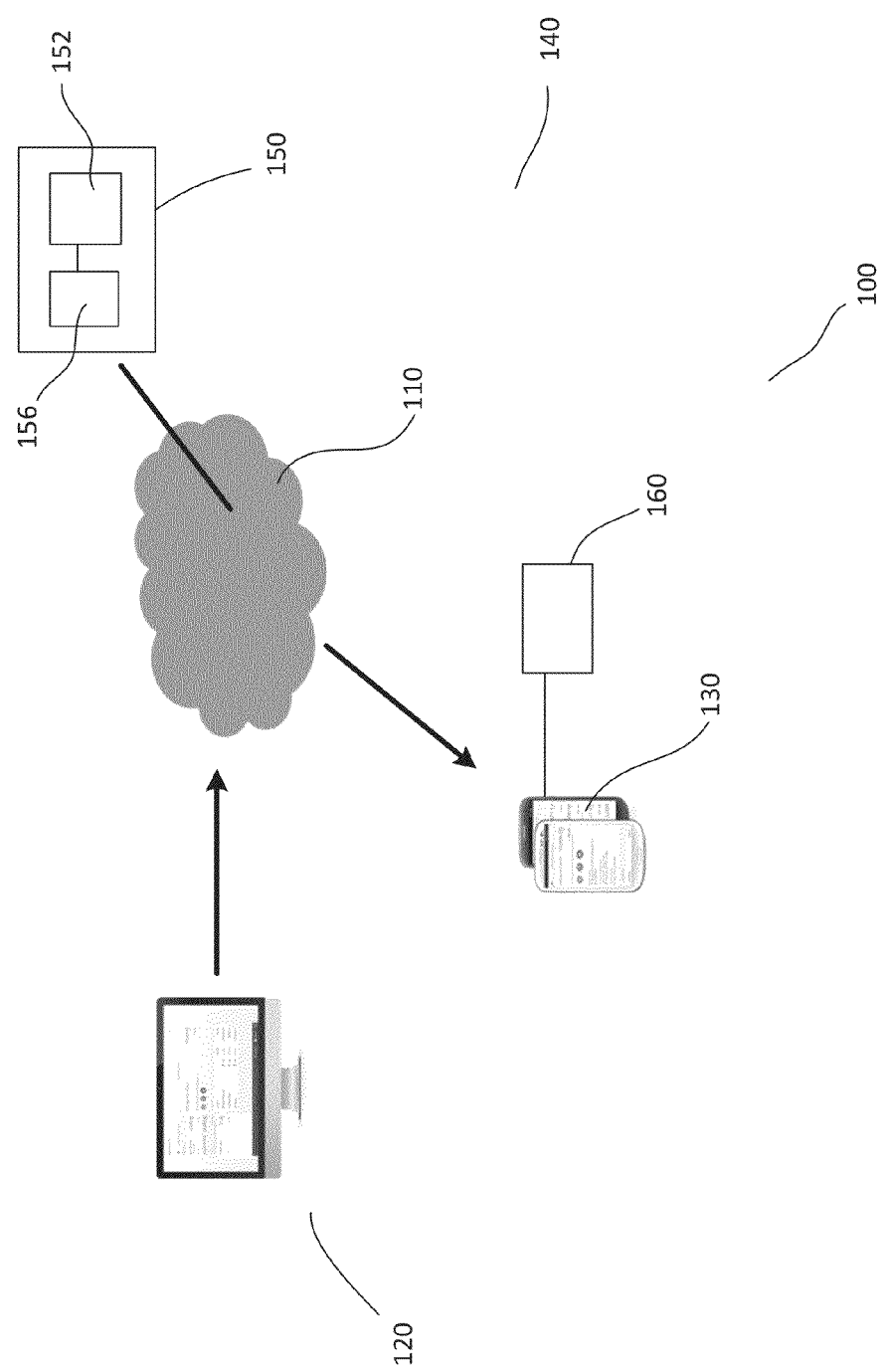
FIG. 1 shows an implementation of an environment.

FIG. 1 shows a simplified diagram of an exemplary environment or architecture 100. Environment 100 may have a distributed architecture. In one implementation, the environment is a cloud computing environment which includes a cloud 110. The cloud, for example, is a server. The server may include one or more computers. A computer includes a memory and a processor. Various types of computers may be employed for the server. For example, the computer may be a mainframe, a workstation, as well as other types of processing devices. The memory of a computer may include any memory or database module. The memory may be volatile or non-volatile types of non-transitory computer-readable media, such as magnetic media, optical media, random access memory (RAM), read-only memory (ROM), removable media, or any other suitable local or remote memory component.

In the case of a plurality of computers, they are collectively considered as the cloud. The computers of the server are connected through a communication network. The communication network may be an internet, an intranet, a local area network (LAN), a wide area network (WAN) or a combination thereof.

The cloud is configured to host and process applications, including storing data associated with the environment. Such hosting and processing may be considered as cloud services provided by the cloud. Various types of cloud services may be provided. The cloud services may be provided in a public, private or hybrid network. The cloud services may be provided by a cloud service provider. For example, the cloud services may be provided by SAP AG. Other types of clouds and cloud providers may also be useful.

End-users may connect to the cloud using end-user devices. An end-user device may be a local computing device with, for example, a local memory and a processor. The memory may be volatile or non-volatile types of non-transitory computer-readable media, such as magnetic media, optical media, random access memory (RAM), read-only memory (ROM), removable media, or any other suitable local or remote memory component. Various types of processing devices may serve as an end-user device. For example, the end-user device may be a PC, a tablet PC, a workstation, a network computer, a kiosk or a mobile computing device, such as a laptop, a tab or a smart phone. Other types of processing devices may also be used. End-user and end-user device may be used interchangeably. For example, when referring to an end-user, it is understood that the end-user connects to the cloud using an end-user device.

Connection to the cloud may be through the internet. The interconnect connection may be using a mobile telecommunication network, such as a 4G network. Other types of connections to the cloud may also be useful. An end-user may access the cloud by having a cloud account. For example, an end-user may access cloud services by logging onto a user account.

In one implementation, the environment 100 includes a hybrid application development system 140. The hybrid application development system 140, in one implementation, is a software tool for efficiently and effectively developing, updating, packaging and deploying Apps. The development system 140 includes an enhanced app developer 150 running on the cloud 110. The enhanced app developer 150 includes a development environment 152. The development environment facilitates in creating and updating Apps. In one implementation, the development environment is an integrated development environment (IDE) 152. The enhanced app developer 150 also includes an automatic deployment generator (DG) 156. The DG facilitates in packaging and deploying new and updated Apps. In one implementation, the DG is an integrated DG (IDG). The system 140 also includes a multi-purpose hybrid container 160. The hybrid container runs on an end-user device 130. The end-user device, as shown, is a mobile device, such as a smart phone. The end-user device may alternatively be a desktop device. It is understood that numerous end-user devices may be communicating with the cloud. The hybrid container sets up the native environment of the end-user device for the App in which to run.

A developer end-user 120 may log on to the cloud 110, accessing the app developer 150. It is understood there may be numerous developer end-users communicating with the cloud 110. Using the IDE running on the cloud, the developer develops an App. In one implementation, the IDE is a web-based IDE. The web-based IDE runs on a web browser. The web-based IDE may be a wizard-based IDE. For example, the IDE includes wizards to guide the developer end-user in developing Apps. The IDE, for example, may be a SAP River RDE from SAP AG Other types of IDEs may also be useful. The App may be a mobile or desktop App. Once the App is finished, the IDG 156, in one implementation, is automatically invoked. When invoked, the IDG packages the App (e.g., source code of the App) and deploys the App package to the cloud. For example, the IDG 156 deploys the App package to an App store or market on the cloud. For example, the IDG packages the App's web content together with all required runtime libraries, Javascript framework, style sheets, images as well as other resources and automatically deploys to the App store on the cloud.

In one implementation, the environment 100 includes a deployment service hosted on the cloud. The App package is forwarded by the IDG 156 to the deployment service, which deploys it to the App store.

As discussed, the development system 140 also includes a multi-purpose hybrid container 160. The multi-purpose hybrid container 160 is prebuilt for different native environments. For example, the hybrid container 160 may be built to run on various native platforms. Native platforms may include mobile platforms, such as iOS, Android and windows mobile, and desktop platforms, such as Windows and MacOSX. Other types of platforms may also be useful. The hybrid container 160, for example, runs on an end-user device. The hybrid container may serve as an App manager, managing the lifecycle of an App. The hybrid container, for example, may include a set of plugins to manage the application credentials, life cycle, as well as other functions. In one implementation, the hybrid container may be a SAP Kapsel Hybrid Container from SAP AG. Other types of hybrid containers may also be useful.

In one implementation, the App is packaged in the multi-purpose hybrid container 160. For example, a new App (version 1) at the App store is contained in the multi-purpose hybrid container. When an end-user downloads the App, the hybrid container is installed to set up the App in the native environment. The hybrid container may be continuously updated to newer version via the Application store or market. For example, whenever the hybrid container is updated, it is pushed to the end-user. The web application content is updated in the hybrid container of the end-user. By continuously updating the hybrid container, developers do not need to setup, maintain and update their own native development environment. This avoids the complicated and error prone process for native application development.

Once deployed, an end-user may log onto the cloud and download the App contained in the hybrid container from the App store. When the App is downloaded, the setup hybrid container is installed and runs on the end-user's device, setting up the native environment for the App. For example, the App is configured to run in the hybrid container.

The IDE may also be used to update Apps. For example, when changes are committed by the developer, the IDG automatically deploys the update to the cloud. From the cloud, the App's web content will be automatically pushed to the hybrid containers running on native platforms of end-users who have already downloaded the App. In one implementation, an application update plugin is provided in the hybrid container. The application update plugin communicates with the deployment service on the cloud to get the updated App automatically pushed to it. A logon manager plugin is also provided in the hybrid container. The logon manager plugin manages who is subscribed for updates. For example, when the App is activated, the logon manager passes current information of the App, such as version and end-user. The cloud service compares the information and determines if there are any updates. Updates are pushed to the App by the deployment service on the cloud.

Figure 2:
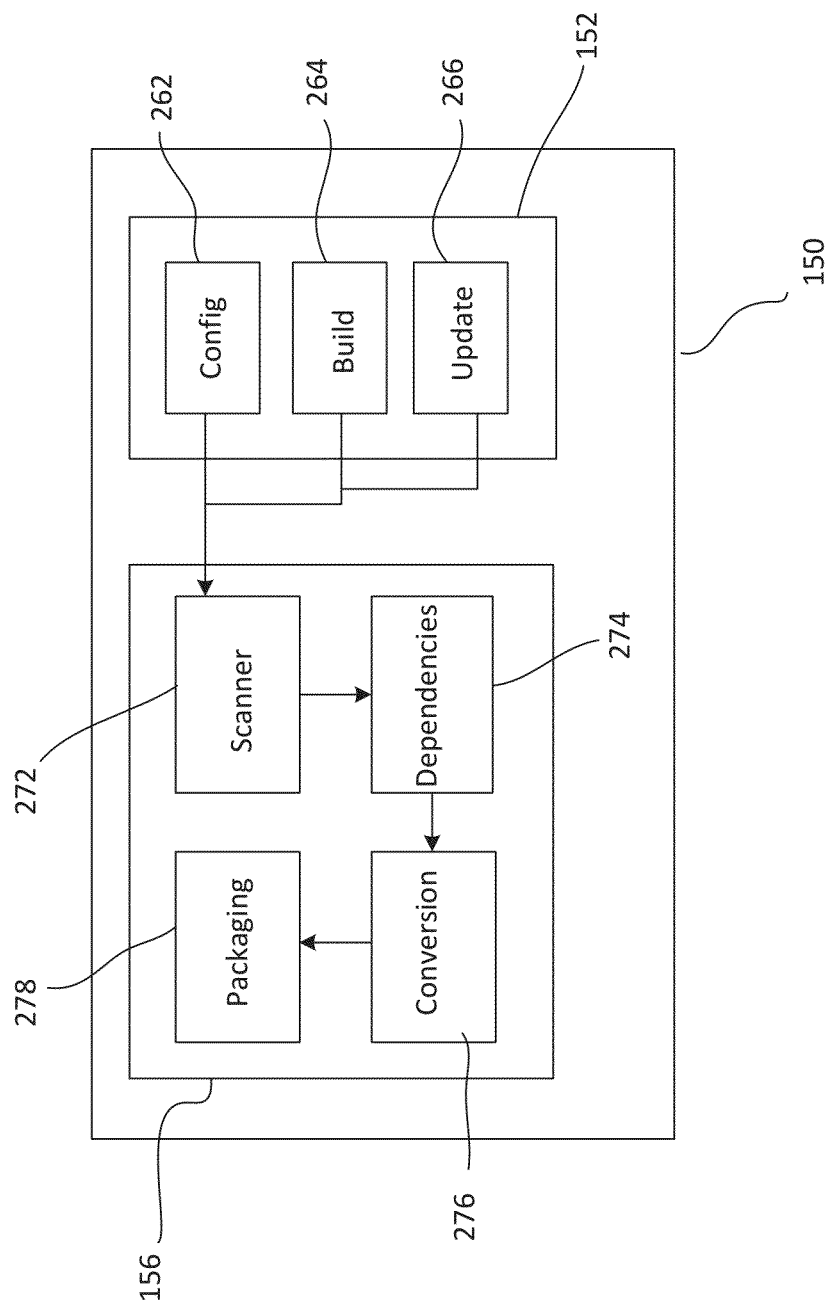
FIG. 2 shows an implementation of an enhanced App developer.

FIG. 2 shows an implementation of an enhanced App developer 150 in greater detail. As shown, the App developer includes an IDE 152 and an IDG 156. The IDE includes an App configuration module 262, an App build module 264 and an App update module 266. As for the IDG, it includes an App scanner module 272, an App dependencies module 274, a file system conversion module 276 and a packaging module 278. Providing the IDE and IDG with other modules may also be useful.

As discussed, the IDE facilitates in developing new Apps and updating existing Apps while the IDG automatically deploys new Apps and updates to the cloud. Updates are then automatically pushed to end-user devices already having the App which needs to be updated.

An App developer end-user may access the enhanced App developer 150 by logging into the cloud. In one implementation, a deployment configuration is performed. For example, the App developer end-user may access the configuration module 262 in the IDE. The deployment configuration includes the developer end-user providing information related to cloud deployment configuration. Such information, for example, may include cloud server name, account name, password, as well as other deployment configuration information. For example, other information may include the target platform and whether automatic update is enabled or not. In one implementation, the App configuration module employs a configuration dialog to facilitate deployment configuration of Apps. The configuration dialog may be activated by selecting it on a menu bar in the IDE. Other techniques to effect deployment configuration may also be useful.

Figure 3:
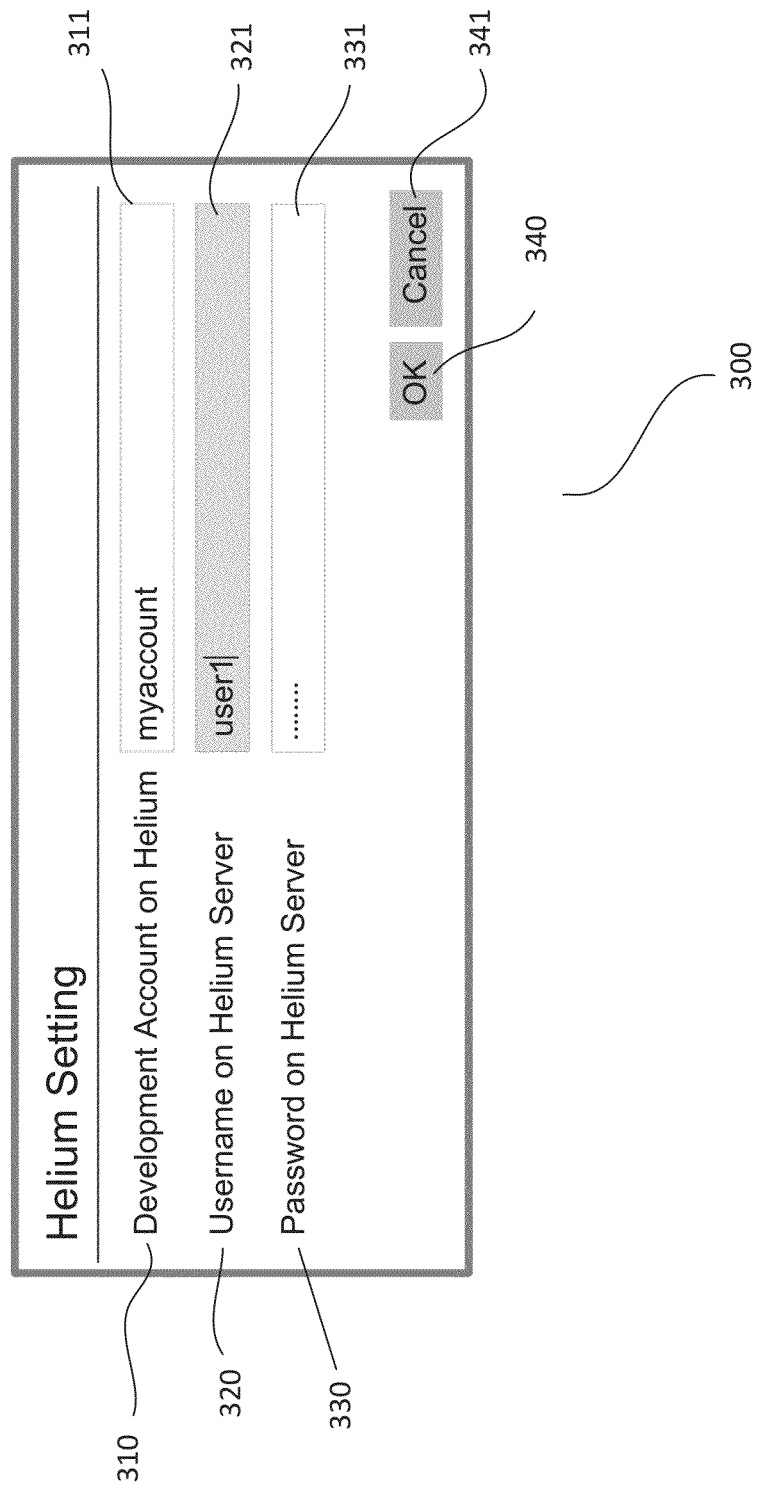
FIG. 3 shows an exemplary implementation of a deployment configuration dialog.

FIG. 3 shows an exemplary implementation of a deployment configuration dialog 300. As shown, the dialog is for the cloud server "Helium". The dialog includes configuration parameters and corresponding boxes 311, 321 and 331 for the user to enter the configuration information 310, 320 and 330. In one implementation, the configuration parameter includes development account, username and password. For example, a user may access his workspace in the server Helium by logging on using the user's username and associated password. Command buttons may be provided in the dialog. In one implementation, OK and Cancel command buttons 340 and 341 are provided. When information is correctly entered, the user may select the OK command button. The cancel button may be selected to clear or remove the dialog.

When a developer end-user creates an App (e.g., version 1), the build module 264 in the IDE is accessed. The build module, in one implementation, provides a project wizard for creating an App. The wizard requests various information from the developer end-user regarding the project or App. For example, the wizard requests project name, information regarding application domain, etc. The wizard provides available templates for the developer end-user to use. The templates, for example, provide format for viewing selected data. Also, the wizard enables the developer to define the type of App, such as mobile or desktop. Other techniques for developing Apps may also be useful. Command buttons may be provided by the wizard. For example, a finished command button may be provided. When selected, the App is finished. The App created using the wizard is translated to source code by the IDE, such as, for example, HTML5, JS and CSS3. Other types of source codes may also be useful.

Figure 4:
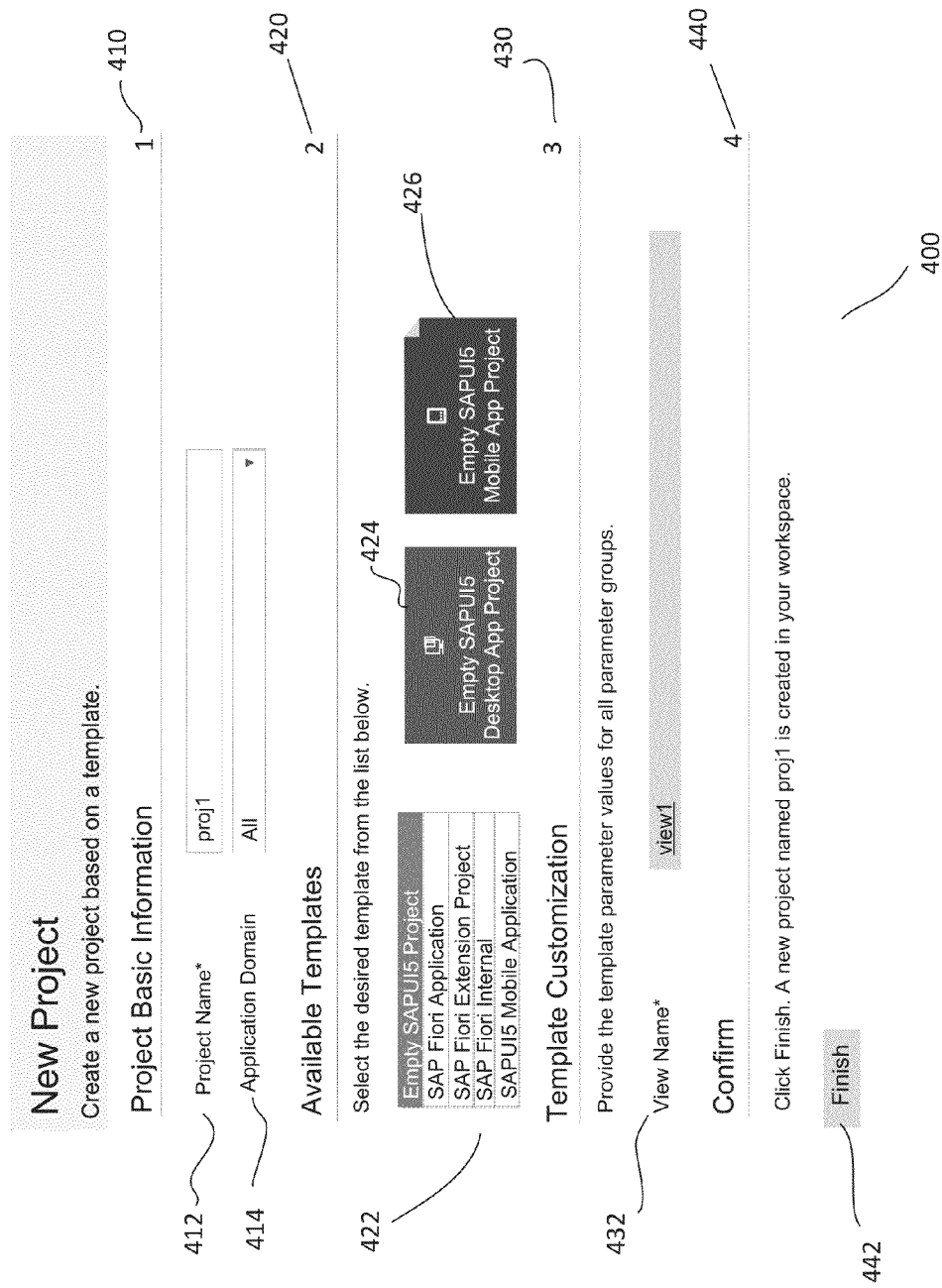
FIG. 4 shows an exemplary implementation of a project wizard.

FIG. 4 shows an exemplary implementation of a project wizard 400. As shown, the project wizard is a new project wizard for creating a new App. The project wizard includes various sections. For example, as shown, the project wizard includes a basic project information section 410, an available template section 420, a template customization section 430 and a confirm section 440. Providing wizards with other sections or other configurations may also be useful.

In the basic project information section 410, project name and application domain fields 412 and 414 are included. The name of the project is provided in the project name field. For example, as shown, the project name is "proj1". As for the Application domain field, it may pertain to the domain for different lines of business, such as CRM, ERM, as well as others. As shown, all domains are selected. The available template section 420 includes a list 422. The list 422 is a list of different project templates which are available for selection. A template may be selected by, for example, clicking on the project box 426. In such case, the template is selected for a mobile-based application. A project box 424 may be provided for desktop-based application. The template customization section 430 includes a view name field 432. The view name field indicates which view is the initial view of the application. In the confirm section, a finish command button 442 is provided. Selecting the finish button, for example by clicking on it, indicates that the project is completed. Including other fields or configurations of the various sections may also be useful.

After the App has been created, the user selects the finish command button 442 on the wizard. This triggers the IDG to run to effect deployment. The deployment process is transparent to the user and runs automatically in the servers on the cloud.

In the case of updating an existing App, the update module 266 in the IDE is accessed. The update module includes a source control (SC) system. The SC system, for example, may be a Git system unit. Other types of SC systems may also be useful. The SC system includes an interface, enabling the user to make updates to the App.

When updates are finished, the user commits the updates by selecting the commit command button in the SC interface. For example, the user commits the updated code. This triggers the IDG to run to effect deployment.

Figure 5:
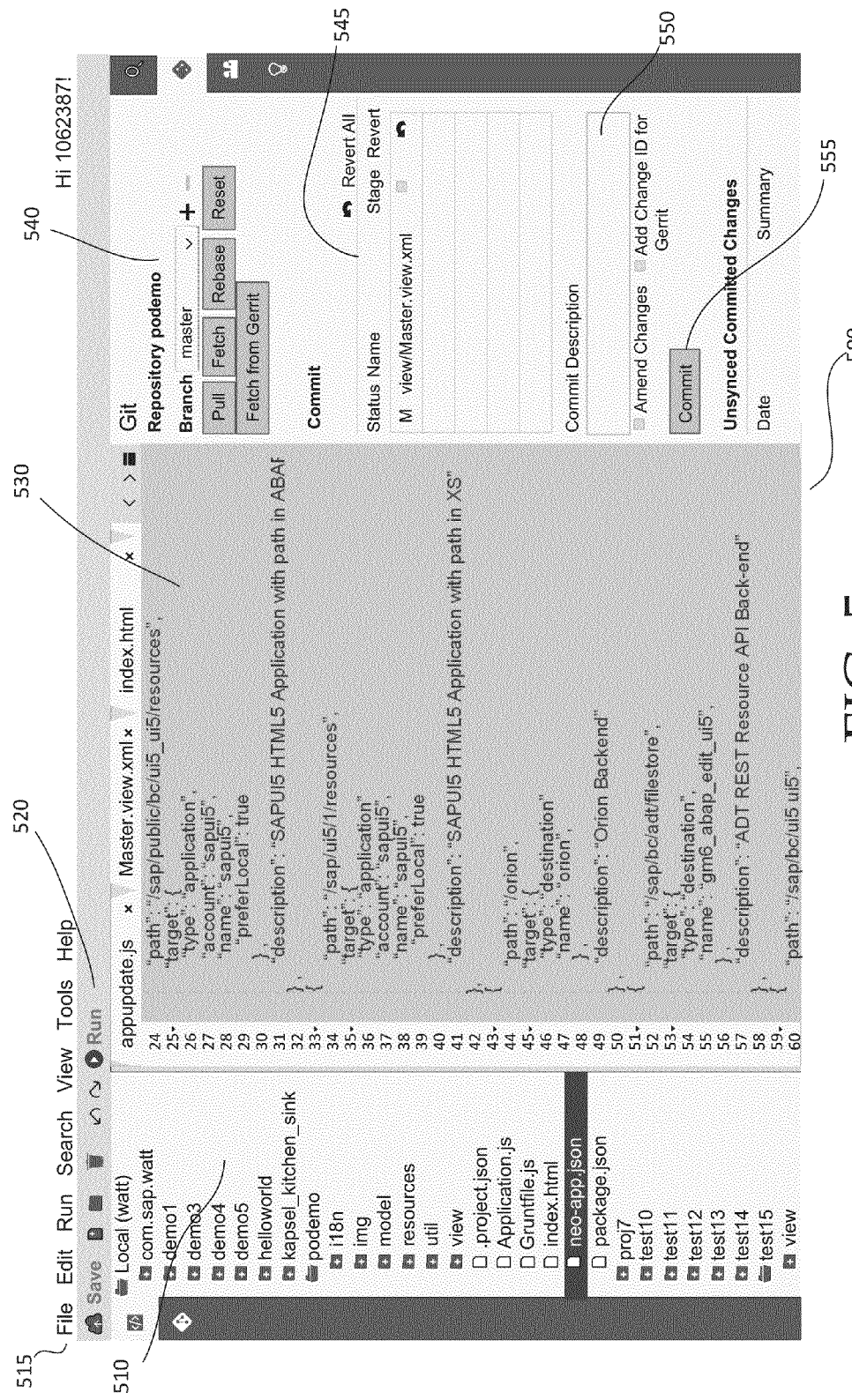
FIG. 5 shows an exemplary implementation of a Source Control interface.

FIG. 5 shows an exemplary implementation of a source control (SC) interface 500. As shown, the SC interface includes a project explorer 510, an IDE main menu 515, an IDE tool bar 520, an IDE text editor 530, a Git tool bar 540, Git status windows 545, a Git commit description input box 550 and a Git commit button 555. Providing other components or configurations for the SC interface may also be useful. The various components are used to effect updating of the App.

In the case of a new App (e.g., version 1) or an updated App (e.g., greater than version 1), the App scanner module 272 of the IDG scans the App. The term App, in this instance, may refer to either a new App or an updated App. For example, the scanner module 272 identifies design time files and removes them, resulting in a scanned App. Design time files may include files, such as project setting and user preference files. Other types of design time files may also be included for removal.

The App dependencies module 274 analyzes the scanned file to resolve application runtime dependencies as well as retrieving dependent libraries. For example, redundant libraries are removed from the dependency list while conflicts in dependencies are resolved. This produces a resolved dependency (RD) App.

The file system conversion module 276 analyzes the RD App. The conversion module 276 converts the App's file system, which is managed by the IDE on the cloud, to files and folders suitable for packaging and network transfer. For example, the App's file system is converted to be compatible to the deployment service on the cloud. This produces a converted App.

The packaging module 278 packages the converted App. In one embodiment, the packaging module includes a compression unit, metadata generator unit, packaging unit and deployment unit.

The compression unit compresses the converted App. Compressing the converted App, in one implementation, includes compressing the files of the converted App into compressed App. File compression, for example, may include minifying JS and CSS codes, compressing large text files into small binary files, as well as other actions. File compression, including code minification, is described in, for example, U.S. patent application Ser. No. 14/032,184, titled, "Packaging and Deploying Hybrid Applications" filed on Sep. 19, 2013, and which is herein incorporated by reference for all purposes.

The metadata generator unit generates a deployment metadata file corresponding to the compressed App. For example, the metadata generator unit analyzes the compressed App's dependencies to generate the metadata file. The metadata file defines the backend services used by the App.

An exemplary deployment metadata file is provided below:
```
{
"name": "PODemo",
"version": "0.0.1",
"main": "www/Application.js",
"repository": {
    "type": "git",
    "url": "https://git.neo.ondemand.com/testsapdev/podemo"
},
"private": true,
"author": "SAP Singapore",
"keywords": [
    "cordova"
],
"dependencies": { },
"devDependencies": {
    "temporary": "0.0.5",
    "cordova": "3.4.0-0.1.3"
        "welcomeFile": "index.html",
"routes": [
    {
        "path": "/resources",
        "target": {
            "type": "destination",
            "name": "ui5dist",
            "preferLocal": true
        },
        "description": "SAPUI5 Dist layer resources"
    },
    {
        "path": "/sap/public/bc/ui5_ui5/resources",
        "target": {
            "type": "application",
            "account": "sapui5",
            "name": "sapui5",
            "preferLocal": true
        },
        "description": "SAPUI5 HTML5 Application with path in ABAP"
    },
    {
        "path": "/sap/ui5/1/resources",
        "target": {
            "type": "application",
            "account": "sapui5",
            "name": "sapui5",
            "preferLocal": true
        },
        "description": "SAPUI5 HTML5 Application with path in XS"
    },
    {
        "path": "/sap/bc/adt/filestore",
        "target": {
            "type": "destination",
            "name": "gm6_abap_edit_ui5"
        },
        "description": "ADT REST Resource API Backend"
    },
    {
        "path": "/sap/bc/ui5_ui5",
        "target": {
            "type": "destination",
            "name": "gm6_abap_execute_ui5"
        },
        "description": "Target Gateway system with UI5 apps"
    },
    {
        "path": "/sap/opu/odata",
        "target": {
            "type": "destination",
            "name": "gm6_abap_odata"
        },
        "description": "GM6 ABAP OData"
    }
]
}
```

The packaging unit packages the compressed App and metadata file to form an App package for deployment. In the case of a new App, for example, version 1 of an App, the compressed App and metadata file is packaged in a hybrid container, forming the App package. For example, the App package includes the compressed App file containing the source code of the new App and the metadata file in the hybrid container. The hybrid container, for example, may be a Kapsel Hybrid Container from SAP AG. For an updated App, for example, greater than version 1, no hybrid container is used. For example, the App package includes the compressed App file and metadata file.

As discussed, the cloud includes a deployment service. The deployment unit of the IDG, for example, deploys the App package to the deployment service on the cloud. The deployment service receives the App package from the IDG. The deployment service exposes its service. For example, the IDG sends a post request to the deployment service. In one implementation, the deployment service exposes its service as a standard REST service. For example, the IDG sends a REST post request to the deployment service.

Communication between IDG and deployment service on cloud, in one implementation, is purely metadata driven. As such, no script or programming language is required between the IDG and deployment service. This advantageously results in a simple and secure interface between the deployment service and IDG.

In the case of a new App, the deployment service deploys the packaged App, which includes the hybrid container, to a persistent repository on the cloud. For example, the App package is deployed to an App store. In the case of an updated App, the deployment service deploys or pushes the App package to hybrid containers of end-users who already have the App.

Figure 6:
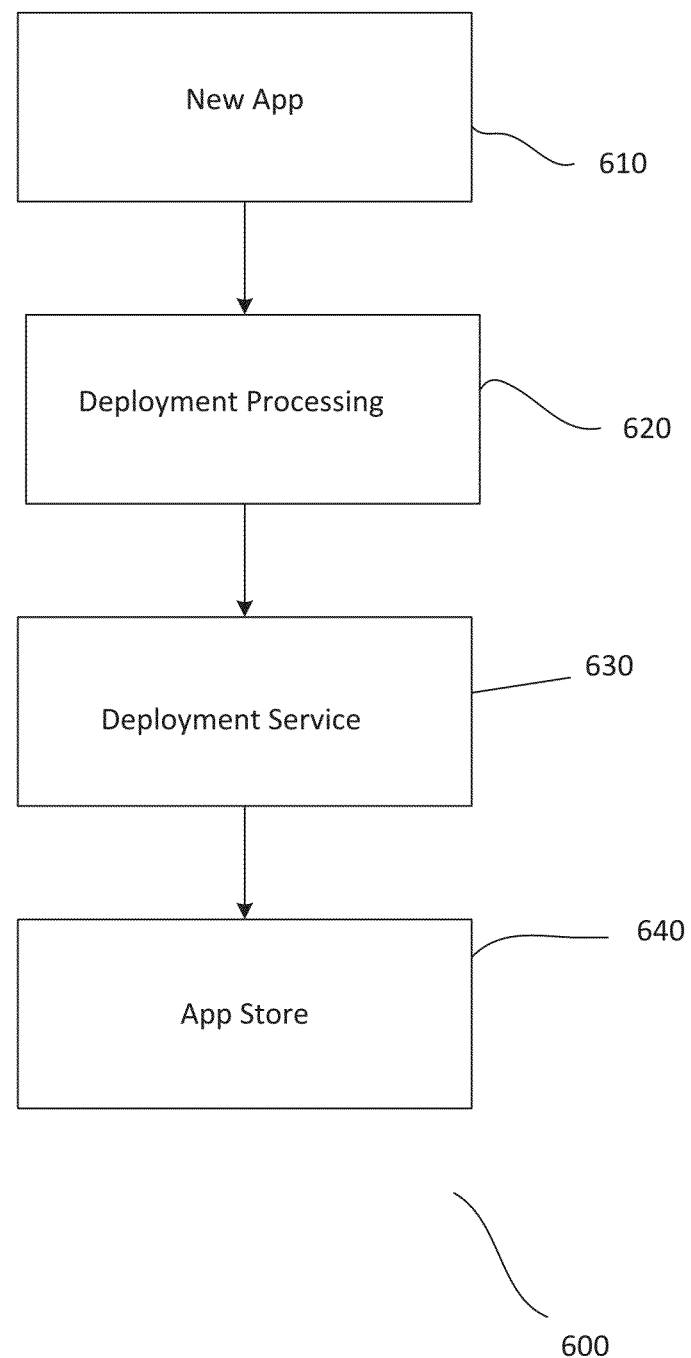
FIG. 6 shows an implementation of a simplified deployment process for a new App.

FIG. 6 shows an implementation of a simplified deployment process 600 for a new App. As shown, the process commences by creating a new App at step 610. In one implementation, the new App is created using the IDE of the enhanced App developer. The App may be created using a project wizard in the IDE. Creating an App using other types of IDE may also be useful.

After the App is completed, the IDG is automatically invoked to process the App at step 620. The IDG, in one implementation, processes the App by scanning it to remove design time files. This, for example, produces a scanned App file. The scanned App file is scanned to resolve runtime dependencies as well as retrieving dependent libraries. This produces a resolved dependency (RD) App file. The RD App's file system is converted to files and folders suitable for packaging and network transfer. A metadata file is also generated, defining the backend services used by the App. After that, the IDG packages the App and metadata file in a hybrid container for deployment. The packaged App, in this case, includes the App, metadata file and hybrid container.

The IDG, at step 630, deploys the packaged App to the deployment service on the cloud. The deployment service deploys the packaged App to the App store at step 640. An end-user may download the App to the hybrid container in the device.

Figure 7:
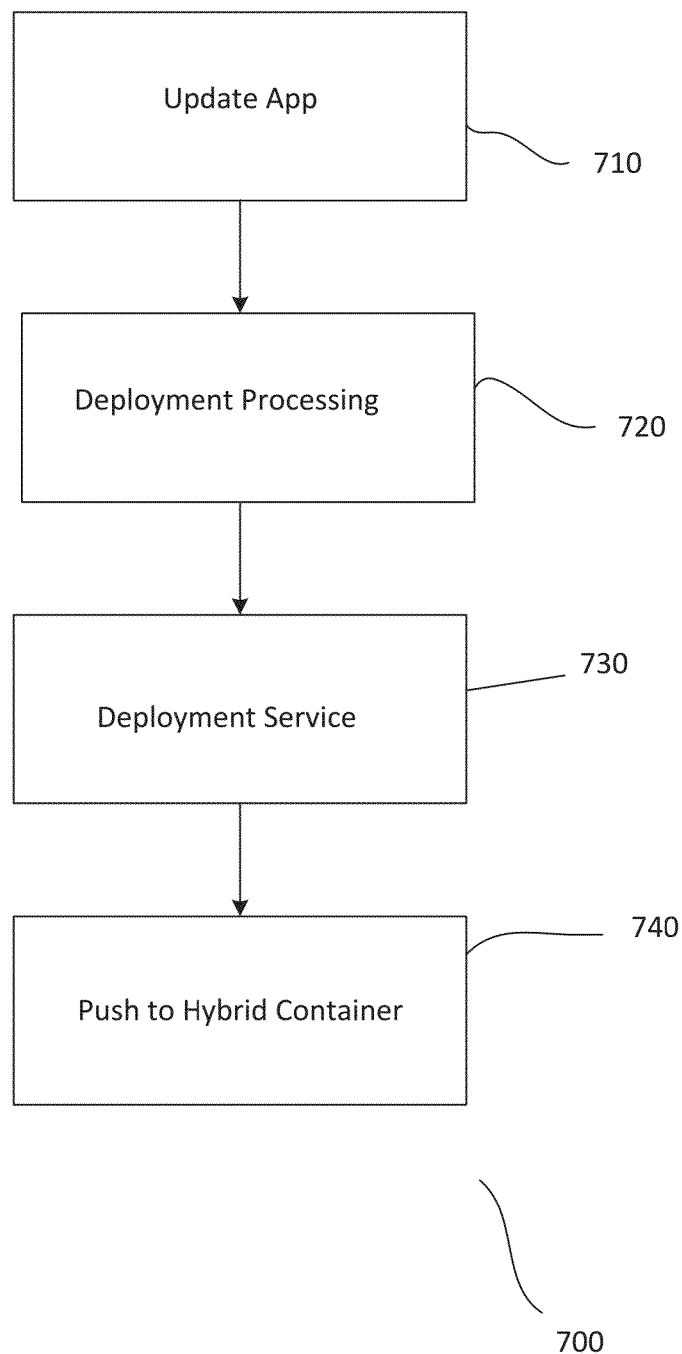
FIG. 7 shows an implementation of a simplified deployment process for an updated App.

FIG. 7 shows an implementation of a simplified deployment process 700 for an updated App. As shown, the process commences by updating an existing App at step 710. In one implementation, the App is updated using the IDE of the enhanced App builder. The App may be updated using a SC system's interface. The SC system may be a Git system. Updating an App using other types of SC systems may also be useful.

After updating is completed, the IDG is automatically invoked to process the updated App at step 720. The IDG, in one implementation, processes the App by scanning it to remove design time files. This, for example, produces a scanned App file. The scanned App file is scanned to resolve runtime dependencies as well as retrieving dependent libraries. This produces a resolved dependency (RD) App file. The RD App's file system is converted to files and folders suitable for packaging and network transfer. A metadata file is also generated, defining the backend services used by the App. After that, the IDG packages the App and metadata file for deployment. For example, the packaged App, includes the App and metadata file.

The IDG, at step 730, deploys the packaged App to the deployment service on the cloud. At step 740, the deployment service pushes the packaged App of the updated App to hybrid containers of user devices which have non-updated version of the App.

The enhanced App developer running on the cloud, as described, simplifies the App deployment workflow. For example, a new App is created in the IDE of the App builder using, for example, a project wizard. Once the source code is committed, the IDG packages the App and metadata file in a hybrid container and automatically deploys the packaged App to, for example, an App store via a deployment service on the cloud. An end-user can easily download the App package and install and setup a hybrid container in the App package to run on the end-user device. The App is installed and runs in the hybrid container on the end-user device. In the case of an update, once the source code is committed, it is automatically deployed to the deployment service on the cloud which then pushes the update to the hybrid container on the end-user device.

Since the App developer with the IDE and IDG and deployment service are all on the cloud, a developer end-user just need a browser to access the App developer for deployment while an end-user needs a hybrid container running on an end-user device. For example, an end-user just needs a hybrid container to receive the deployment and updates.

As described, the application development system may be embodied as an application. For example, the application development system may be embodied as a software application. The different components of the system may be separate software applications configured to operate or interact with each other, whether on the cloud or on the end-user devices. The source code of the applications may be compiled to create an executable code. The codes, for example, may be stored in a storage medium, such as one or more storage disks or in memory of a server and/or end-user devices. Other types of storage media may also be useful.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of packaging and deploying a hybrid application, comprising:
   in response to a user event, providing a source code of the hybrid application by a development environment running on a cloud server; and
   automatically invoking a deployment generator to receive the source code of the hybrid application by a deployment generator running on the cloud server, wherein the deployment generator comprises performing,
      scanning the source code of the hybrid application to identify and remove design time files, resulting in a scanned application file,
      analyzing the scanned application file to resolve runtime dependencies of the hybrid application as well as retrieving dependent libraries, resulting in a resolved application file,
      converting the resolved application file to files and folders compatible for deployment to a deployment service on the cloud server, resulting in a converted application file,
      compressing the converted application file to form a compressed application file,
      generating a deployment metadata file,
      packaging the compressed application file and the deployment metadata file to produce an application package, and
      deploying the application package to a deployment service on the cloud server.

2. The method of claim 1 wherein:
the hybrid application comprises a new hybrid application;
the application package comprises the compressed application file and the deployment metadata file packaged in a hybrid container; and
the deployment service on the cloud server deploys the application package to an application store.

3. The method of claim 1 wherein:
the hybrid application comprises an update hybrid application;
the application package comprises the compressed application file and the deployment metadata file; and
the deployment service on the cloud server deploys the application package to a hybrid container running on an end-user device.

4. A computer-implemented method of packaging and deploying a hybrid application, comprising:
in response to a user event, providing a source code of the hybrid application by a development environment running on a cloud server; and
automatically invoking a deployment generator to receive the source code of the hybrid application by a deployment generator running on the cloud server, wherein the deployment generator comprises performing,
scanning the source code of the hybrid application to identify and remove design time files, resulting in a scanned application file,
resolving runtime dependencies as well as retrieving dependent libraries of the scanned application file which results in a resolved application file,
converting the resolved application file to files and folders compatible for deployment to a deployment service on the cloud server, resulting in a converted application file,
compressing the converted application file to form a compressed application file,
generating a deployment metadata file,
packaging the compressed application file and the deployment metadata file in a hybrid container to form a hybrid application package, and
deploying the hybrid application package to the deployment service on the cloud server.

5. The method of claim 4 comprising configuring the hybrid application for deployment.

6. The method of claim 5 wherein the user event comprises:
a developer logging into the cloud server; and
creating the hybrid application by the developer using the development environment running on the cloud server, wherein the source code of the hybrid application is automatically passed to the deployment generator on the cloud server by the development environment when the hybrid application is completed.

7. The method of claim 6 wherein packaging comprises:
packaging the source code of the hybrid application in the hybrid container to form the hybrid application package, the hybrid container runs on different native platforms; and
wherein the deployment service on the cloud server deploys the hybrid application package to an application store.

8. The method of claim 6 wherein packaging comprises:
compressing the source code of the hybrid application;
generating a metadata file of the compressed source code of the hybrid application;
packaging the compressed source code of the hybrid application and the metadata file in the hybrid container to form a new application package, the hybrid container runs on different native platforms; and
wherein the deployment service on the cloud server deploys the new application package to an application store.

9. The method of claim 4 wherein the deployment service deploys the hybrid application package to an application store.

10. The method of claim 9 comprising:
installing the hybrid container on an end-user device by an end-user when the end-user downloads the hybrid application package from the application store to the end-user device; and
the hybrid application runs in the hybrid container in the end-user device.

11. The method of claim 10 wherein an update of the hybrid application is automatically pushed to the hybrid container running on the end-user device.

12. The method of claim 4 wherein the user event comprises:
a user logging into the cloud server;
updating the hybrid application by the user using the development environment running on the cloud server,
automatically passing a source code of a completed update of the hybrid application to the deployment generator;
packaging the source code of the completed update of the hybrid application to form an update application package by the deployment generator; and
deploying the update application package to the deployment service on the cloud server.

13. The method of claim 12 wherein the cloud deployment service automatically pushes the update application package to the hybrid container running on an end-user device for an earlier version of the update application.

14. An application development system comprising:
a computer system having a processor and a non-transitory storage medium, the computer system is disposed on a cloud network, the computer system having an application developer, wherein the application developer comprises,
a development environment, the development environment enables a developer to create a new hybrid application or update an existing hybrid application to produce an update hybrid application, and
a deployment generator for packaging the new hybrid application or packaging the update hybrid application, the deployment generator includes
an application scanner module for scanning a source code of the new or update hybrid application to identify and remove design time files, resulting in a scanned new or update application file,
an application dependencies module for resolving runtime dependencies as well as retrieving dependent libraries of the new or update scanned application file which results in a resolved new or update application file,
a file system conversion module for converting the resolved new or update application file to files and folders compatible for deployment to a deployment service on the cloud network, and
a packaging module having
a compression unit for compressing a source code of the new or update hybrid application to form a compressed new or update application file,
a metadata generator unit for generating a metadata file to define back end service used by the new or update hybrid application, a packaging unit for packaging the compressed new or update hybrid application file and metadata file to produce an application package for deployment to the deployment service on the cloud network, and a deployment unit for deploying the application package to the deployment service on the cloud network.

15. The system of claim 14 further comprising a hybrid container running on an end-user device, the hybrid container sets up a native environment of an end-user device in which the new hybrid application runs or the update hybrid application runs.

16. The system of claim 15 wherein:

the development environment is an integrated development environment;

the deployment generator is an integrated deployment generator; and wherein the deployment generator is automatically invoked when the new hybrid application is completed or when the update hybrid application is completed.

17. The system of claim 14 wherein:

for the new hybrid application, the packaging unit packages the compressed new application file and metadata file in a hybrid container to produce the application package which is a new application package for deployment to the deployment service which deploys it to an application store; and for the update hybrid application, the packaging unit packages the compressed update application file and metadata file to produce the application package which is an update application package for deployment to the deployment service which pushes the update application package to the hybrid container running on the end-user device.

* * * * *